Patented Aug. 20, 1946

2,406,174

UNITED STATES PATENT OFFICE 2,406,174

BACTERIAL PROCESSES

Jacob L. Stokes, Scotch Plains, N. J., assignor to Merck & Co., Inc., Rahway, N. J., a corporation of New Jersey No Drawing. Application October 1, 1942, Serial No. 460,423

7 Claims. (Cl. 195—96)

This invention relates to an improved process for the production of tyrothricin.

Tyrothricin is a therapeutically important antibacterial substance which exerts a bactericidal effect on both gram-positive, and gram-negative micro-organisms. Tyrothricin is active in extremely small amounts against pathogenic bacteria such as Staphylococci, Streptococci, and Pneumococci. It has also been found effective in the treatment of localized infections, and in chronic bovine mastitis.

A method for producing tyrothricin by cultivation of an aerobic sporulating bacillus in hydrolized casein, tryptone, or similar media, has been described by Dubos and Dubos and Cataneo (Jr. Exp. Med., vol. 70, pp. 1–10 and 249–256, 1939). The bacillus used in the described process of the prior art referred to was later identified as *Bacillus brevis* (Dubos, Jr. Exp. Med., vol. 73, pp. 639–640).

That prior art method required the practice of shallow processes, i. e., cultivation of the sporulating bacillus in shallow layers (3 cm. deep). Such shallow cultivation processes are disadvantageous in that they are time-consuming, require an extensive plant, and are less efficient for large-scale commercial purposes than deep or submerged processes.

I have now discovered a method whereby tyrothricin may be produced in deep layers, i. e., submerged cultures. The advantages to be derived from the use of such submerged cultures, as compared to shallow layers, are impressive, and constitute a tremendous economy in space, labor, equipment, and time, with resultant economy in production costs.

Although hydrolyzed casein, tryptone, yeast extract, and other media consisting primarily of proteins and intermediate products of protein break-down, are suitable for tyrothricin formation in shallow layer cultures of *Bacillus brevis*, tyrothricin cannot be isolated from deep-layer or submerged cultures of such media, despite the fact that excellent bacterial growth occurs in deep cultures thereof. It appears that in deep layers of such media, the metabolism of the bacteria is so altered that, either tyrothricin is not formed, or possibly, it is formed, but is immediately utilized by the bacteria and does not accumulate in the medium. Whatever the reason, it is a fact that numerous attempts have been made by me over a prolonged period of time to isolate tyrothricin from submerged cultures of *Bacillus brevis*, in tryptone medium, for example, without success, even though during such attempts many variations were made in environmental conditions, such as variations in the rate of aeration, rate of stirring, period of incubation, temperatures during incubation, etc.

My invention, therefore, contemplates, inter alia, the utilization of synthetic media, i. e., media the constituents of which are all capable of expression in terms of chemical formulae, for the cultivation of species or strains of aerobic sporeforming bacteria, of the type of *Bacillus brevis* and closely related species or strains of bacilli, in deep cultures, for the production of tyrothricin. The bacilli are of the "active" group isolated from soil, and composed of strains whose broth cultures possess readily demonstrable bactericidal properties. Such strains are described in Jr. Bacteriology, vol. 43, No. 2, February, 1942, pp. 253–63; they form $H_2S$ in peptone media, do not hydrolyze starch, and are gram-negative in 18- to 24-hour broth cultures.

The synthetic media according to my invention comprise mixtures of inorganic salts, to which are added a suitable source of carbohydrate, such as glucose, for example, and a source of nitrogen. The inorganic salts may be the usual salts used in synthetic media for bacteria processes. However, the source of nitrogen used in the synthetic media for the purposes of my invention must be carefully selected. Not all substances known to be sources of nitrogen are suitable for addition to a synthetic medium for the production of tyrothricin in deep cultures. I have found that excellent results are obtained by the submerged process of my invention, if the source of nitrogen used in the synthetic media is an amino acid selected from the group consisting of $\beta$-alanine, dl-phenyl alanine, dl-aspartic acid, glycine, dl-glutamic acid, dl-leucine, laevoproline, laevo-histidine monohydrochloride, and dl-isoleucine, or combinations of such amino acids, as for example, combinations or mixtures comprising four of the mentioned amino acids. Ammonium phosphate may also be utilized as a source of nitrogen in a synthetic medium according to my invention, for the production of tyrothricin in submerged cultures, but is not as satisfactory as the amino acids specifically mentioned herein. The yield of tyrothricin obtained by cultivating the selected aerobic sporulating bacillus in a medium containing ammonium phosphate as a source of nitrogen is lower than the yield obtained when the bacillus is cultivated in a synthetic medium containing the designated amino acids as a source of nitrogen.

Although amino acids selected from the group consisting of β-alanine, dl-phenyl alanine, dl-aspartic acid, glycine, dl-glutamic acid, dl-leucine, laevo-proline, laevo-histidine mono-hydrochloride, and dl-isoleucine, either individually, or in small groups, may be utilized in a synthetic medium according to my invention, for the production of tyrothricin in deep layers, with excellent results, I have found that it is not desirable to attempt to utilize a mixture comprising all of the mentioned amino acids plus l-cystine, dl-lysine, l-tryptophane, dl-methionine and l-tryrosine for such purposes. When a synthetic medium was prepared containing such a mixture comprising all of the mentioned amino acids, and the medium was inoculated with Bacillus brevis or closely related strains of bacilli, as disclosed herein, tyrothricin was not obtained from the deep cultures. Furthermore, when such a mixture comprising all of the amino acids mentioned above is added to a synthetic medium which is otherwise satisfactory for the purposes of my invention, such as a medium comprising a mixture of inorganic salts, glucose, and dl-glutamic acid, and the medium is inoculated with Bacillus brevis or the like, the formation of tyrothricin is inhibited.

Nor are all amino acids suitable sources of nitrogen for use in a synthetic medium for the production of tyrothricin in submerged cultures. Thus, for example, laevo-tyrosine is not a satisfactory source of nitrogen for such purposes. The utilization of the nitrogen source by Bacillus brevis or related strains of bacilli, for the production of tyrothricin in deep cultures, appears to be selective, and many of the substances known to be sources of nitrogen are not suitable for use in the process of my invention. Thus, it appears that Bacillus brevis cannot utilize nitrate nitrogen. If urea, ammonium chloride, ammonium nitrate, or mono-ammonium phosphate are substituted in a synthetic medium for the amino acids disclosed herein, the formation of tyrothricin in deep layers does not occur.

As an example, a synthetic medium according to my invention may comprise the following constituents: calcium mono-phosphate (preferably in the form of a saturated aqueous solution), potassium hydrophosphate, dihydro-potassium phosphate, magnesium sulfate, sodium chloride, ferrous sulfate, and manganese sulfate; glucose, and dl-glutamic acid.

It will be understood, of course, that modifications may be made in the specific inorganic salt mixture illustrated herein, both with respect to the particular inorganic salts, and also with respect to their quantitative relationships.

Such synthetic media are highly satisfactory for deep-layer or submerged cultivation of the bacilli, with consequent formation of high yields of tyrothricin. The synthetic media of my invention also have the further advantage that they may be chemically characterized, and therefore, may be readily duplicated.

In carrying out the submerged process of my invention, the selected synthetic culture medium, in sterile condition, is inoculated with a suitable broth culture of the selected sporulating aerobic bacillus. It is desirable that the culture be aerated and agitated during the incubation period. Aeration may be achieved by passing a stream of air into the culture, and, depending upon the type of chamber in which the process is conducted, agitation may be effected in any appropriate manner, as by stirring, rotating, the use of propeller blades, shaking, etc. The temperature of the culture during incubation is preferably maintained at about 37° C.

The yield of tyrothricin obtained by the submerged process, according to my invention, compares very favorably with that obtained by the shallow-layer processes of the art, and, in fact, has been found to be as high as 29% greater per liter-volume of culture. The time required for tyrothricin formation in good yields by my submerged process is only about one-half the time required in the shallow-layer process. The product obtained by my process exhibits the same in vitro and in vivo activity as that produced in shallow cultures in tryptone medium, and, furthermore, generally speaking, is a much finer and whiter product.

The following examples illustrate methods of carrying out the present invention, but it is to be understood that these examples are given by way of illustration, and not of limitation.

*Example I*

700 cc. of a mixture having the following composition:

| | |
|---|---:|
| Saturated aqueous solution of calcium monophosphate___cubic centimeters__ | 2 |
| Potassium hydrophosphate_____gram__ | 0.5 |
| Dihydro potassium phosphate_____do____ | 0.5 |
| Magnesium sulfate (heptahydrate)__do____ | 0.2 |
| Sodium chloride_____do____ | 0.01 |
| Ferrous sulfate (heptahydrate)____do____ | 0.01 |
| Manganese sulfate (tetrahydrate)__do____ | 0.01 |
| Water_____cubic centimeters__ | 1000 |
| dl-Glutamic acid_____per cent__ | 0.25 | is adjusted to pH 7 and is sterilized in a one-liter Erlenmeyer flask. 10 gms. of sterilized glucose are added, and the whole inoculated with about 0.2% of a tryptone broth culture of Bacillus brevis. An aeration tube is inserted into the culture, which is agitated and aerated by passing in a slow stream of air, while being incubated at 37° C. Incubation is allowed to proceed for from 36–60 hours, after which time profuse bacterial growth is evident. The pH of the culture is then adjusted to about 4.6–4.8, and a precipitate forms which consists of vegetative cells, spores, cellular debris, and tyrothricin. The precipitate is collected by appropriate means, as by centrifugation or filtration, and suspended in 95% ethyl alcohol (20 cc. of alcohol for each liter of culture) for from 18–24 hours. The alcoholic suspension is filtered, and the alcohol extract evaporated to dryness, extracted with ether to remove fatty impurities, and redissolved in 95% ethyl alcohol. The alcohol solution is mixed with 10 volumes of a 1% sodium chloride solution which precipitates tyrothricin. The precipitated tyrothricin is collected and dried in vacuo at room temperature, or at about 37° C. The product, tyrothricin, occurs in the form of a fine, white powder.

*Example II*

Five liters of a culture medium as described in Example I are placed in two-gallon glass-lined or carbon steel fermenters and sterilized; (glucose sterilized separately and added to the sterile inorganic salt mixture), and the whole is inoculated with a 2% tryptone broth culture of Bacillus brevis. Aeration is effected by passing in 1.5 liters of air per minute, and agitation is provided by means of propeller blades rotating at 60 R. P. M. The temperature of the culture during incubation is maintained at about 37° C. After from 36–60 hours, tyrothricin is isolated in accordance with the procedure described in Example I.

Modifications may be made in carrying out the present invention, without departing from the spirit and scope thereof. Thus, for example, quantitative relationships of the inorganic salts may be varied. Generally speaking, the amounts of the various salts present in a synthetic medium are not of critical importance in bacterial processes; however, it is desirable to avoid large excesses or extremely small amounts. The specific synthetic medium exemplified herein is illustrative, only, and my invention is to be limited only by the appended claims.

I claim:

1. In a process for obtaining an anti-bacterial substance the step that includes cultivation of strains of *Bacillus brevis*, under aerobic submerged conditions, in an aqueous medium containing as a source of nitrogen a substance selected from the group consisting of β-alanine, dl-phenyl alanine, dl-aspartic acid, glycine, dl-α-alanine, laevo-hydroxyproline, dl-threonine, dl-serine, dl-valine, dl-glutamic acid, dl-leucine, laevo-proline, laevo-histidine monohydrochloride and dl-isoleucine.

2. The process that comprises cultivating strains of *Bacillus brevis*, under aerobic submerged conditions, in an aqueous solution of a synthetic medium containing as a source of nitrogen a substance selected from the group consisting of β-alanine, dl-phenyl alanine, dl-aspartic acid, glycine, dl-α-alanine, laevo-hydroxyproline, dl-threonine, dl-serine, dl-valine, dl-glutamic acid, dl-leucine, laevo-proline, laevo-histidine monohydrochloride and dl-isoleucine, and recovering tyrothricin.

3. The process that comprises cultivating strains of *Bacillus brevis*, under aerobic submerged conditions, in an aqueous solution of a synthetic medium comprising a mixture of inorganic salts, a source of carbohydrate, and a source of nitrogen selected from the group consisting of β-alanine, dl-phenyl alanine, dl-aspartic acid, glycine, dl-α-alanine, laevo-hydroxyproline, dl-threonine, dl-serine, dl-valine, dl-glutamic acid, dl-leucine, laevo-proline, laevo-histidine monohydrochloride, and dl-isoleucine, and recovering tyrothricin.

4. In a process for obtaining an anti-bacterial substance the step that includes cultivation of strains of *Bacillus brevis*, under aerobic submerged conditions, in an aqueous medium comprising a mixture of inorganic salts consisting of calcium monophosphate, potassium hydrophosphate, dihydropotassium phosphate, magnesium sulfate, sodium chloride, ferrous sulfate, and manganese sulfate, a source of carbohydrate, and a source of nitrogen selected from the group consisting of β-alanine, dl-phenyl alanine, dl-aspartic acid, glycine, dl-α-alanine, laevo-hydroxyproline, dl-threonine, dl-serine, dl-valine, dl-glutamic acid, dl-leucine, laevo proline, laevo-histidine monohydrochloride and dl-isoleucine.

5. In a process for obtaining an anti-bacterial substance the step that includes cultivation of strains of *Bacillus brevis*, under aerobic submerged conditions, in an aqueous medium comprising a mixture of inorganic salts consisting of calcium monophosphate, potassium hydrophosphate, dihydro potassium phosphate, magnesium sulfate, sodium chloride, ferrous sulfate, and manganese sulfate; glucose, and a source of nitrogen consisting of dl-glutamic acid.

6. In a process for obtaining an anti-bacterial substance the step that includes cultivation of strains of *Bacillus brevis*, under aerobic submerged conditions, in an aqueous medium comprising a mixture of inorganic salts, glucose and a source of nitrogen consisting of dl-glutamic acid.

7. In a process for obtaining an anti-bacterial substance the step that includes cultivation of strains of *Bacillus brevis*, under aerobic submerged conditions, in an aqueous medium comprising a mixture of inorganic salts, a source of carbohydrate, and a source of nitrogen consisting of dl-glutamic acid.

JACOB L. STOKES.